United States Patent
Wiggins

[11] Patent Number: 5,979,638
[45] Date of Patent: Nov. 9, 1999

[54] CONVEYOR BELT WIPER BLADE

[75] Inventor: Daniel Wiggins, Marquette, Mich.

[73] Assignee: Argonics, Inc., Marquette, Mich.

[21] Appl. No.: 08/915,606

[22] Filed: Aug. 21, 1997

[51] Int. Cl.[6] .................................................. B65G 45/12
[52] U.S. Cl. ............................................................. 198/497
[58] Field of Search ..................................... 198/497, 499

[56] References Cited

U.S. PATENT DOCUMENTS

| | | |
|---|---|---|
| 3,811,557 | 5/1974 | Hartwig . |
| 3,913,728 | 10/1975 | Pott . |
| 3,998,322 | 12/1976 | McBride . |
| 4,131,194 | 12/1978 | Andersson . |
| 4,202,437 | 5/1980 | Gordon . |
| 4,257,517 | 3/1981 | MacPherson et al. . |
| 4,269,301 | 5/1981 | Gibbs . |
| 4,349,098 | 9/1982 | Veenhof . |
| 4,489,823 | 12/1984 | Gordon . |
| 4,533,036 | 8/1985 | Gordon . |
| 4,598,823 | 7/1986 | Swinderman . |
| 4,643,293 | 2/1987 | Swinderman . |
| 4,658,949 | 4/1987 | Reicks . |
| 4,787,500 | 11/1988 | Holz . |
| 4,825,996 | 5/1989 | Davidts . |
| 4,838,409 | 6/1989 | Rappen . |
| 4,854,443 | 8/1989 | Gordon . |
| 4,917,231 | 4/1990 | Swinderman . |
| 4,953,689 | 9/1990 | Peterson et al. . |
| 4,962,845 | 10/1990 | Gibbs . |
| 5,016,746 | 5/1991 | Gibbs . |
| 5,088,965 | 2/1992 | Swinderman et al. . |
| 5,222,589 | 6/1993 | Gordon . |
| 5,887,702 | 3/1999 | Mott ........................................ 198/499 |

FOREIGN PATENT DOCUMENTS

| | | |
|---|---|---|
| 0328171 | 8/1989 | European Pat. Off. . |
| 1342834 | 10/1987 | U.S.S.R. . |
| 1515061 | 6/1978 | United Kingdom . |
| 2012234 | 7/1989 | United Kingdom . |
| 2221440 | 2/1990 | United Kingdom . |

OTHER PUBLICATIONS

Advertising brochure of ASGCO® (ASG–SKLP4–May 1992) for Skalper IV Replacement Blade.

*Primary Examiner*—Joseph E. Valenza
*Attorney, Agent, or Firm*—Jim Zegeer

[57] ABSTRACT

A wiper blade for endless conveyor belts has three basic components or features which improves blade performance over the prior art. These components include:

1. a multiradius side profile having a concavity defining the torsion resistance point,
2. a thicker base section, and
3. a high profile metal mounting insert.

These three components act together to substantially reduce the bending moments associated with wiper blade operation and provide an improved structural profile with a high moment of inertia and shorter effective column length. These structural improvements allow the use of softer and more wear-resistant elastic polymers without the risk of blade buckling. The multiradius concave side profiles allow the use of a short thin blade tip profile which transitions to the thicker, ridged base profile. The bending moment generated by the operational forces is now resisted primarily at the transition point of the two profiles, e.g. at the point of maximum concavity on the side opposite the conveyor and head pulley facing side of the blade. This effectively reduces the offset or eccentricity of loading up to 50% over the prior art and, thereby, reduces the bending moment to up to 50%. This reduces the tendency of the blade tip to curl downward towards the mounting base and buckle.

3 Claims, 2 Drawing Sheets

CONVEYOR BELT WIPER BLADE

The present invention is directed to an improved wiper blade for scraping and cleaning the surfaces of endless conveyor belts.

BACKGROUND AND BRIEF DESCRIPTION OF THE INVENTION

Gordon U.S. Pat. No. 5,222,589, depicted in FIG. 3, is directed to a conveyor belt cleaning system and discloses a belt wiper 3W which consists essentially a narrow flat base 3B with two constant radius arcs AL and AR starting at each corner of the narrow base 3B and meeting at a point forming the blade tip or scraper edge 3SE. These previous blades were attached to tensioning frames by a metal insert 3MI which has a short profile and cast within the elastic polymer blade body. Blade sidewall AL is concave towards the belt conveyor and the head pulley, and the other blade sidewall AR is convex away from the belt conveyor and head pulley.

This design produces a relatively long and narrow profile of limited structure rigidity (low moment of inertia and a long effective column length). Operational forces on this type of blade design produce relatively large bending moments which are resisted by the short profile metal mounting insert. Blades of this profile resist operational forces by the tip deflecting downward toward the base. The offset of the blade tip relative to the mounting insert produces this large bending moment when coupled with deflecting force at the tip (eccentrically loaded member).

The consequences of this profile design are that harder, less wear-resistant polymers should be used to compensate for the lack of structural rigidity and large bending moments. In severe cases, these conditions have caused a large number of blade failures in the field due to buckling, as the blade tips "curl under" when obstructions are encountered.

THE PRESENT INVENTION

The object of the present invention is to provide an improved wiper blade for endless conveyor belts.

In the present invention, there are three basic components or features of the wiper blade profile which improves blade performance over the prior art. These components include:

1. a multiradius side profile having a concavity defining the torsion resistance point,
2. a thicker base section, and
3. a high profile metal mounting insert.

These three components act together to substantially reduce the bending moments associated with wiper blade operation and provide an improved structural profile with a high moment of inertia and shorter effective column length. These structural improvements allow the use of softer and more wear-resistant elastic polymers without the risk of blade buckling. The multiradius concave side profiles allow the use of a short thin blade tip profile which transitions to the thicker, ridged base profile. The bending moment generated by the operational forces is now resisted primarily at the transition point of the two profiles, e.g. at the point of maximum concavity on the side opposite the conveyor and head pulley facing side of the blade. This effectively reduces the offset or eccentricity of loading up to 50% over the prior art and, thereby, reduces the bending moment to up to 50%. This reduces the tendency of the blade tip to curl downward towards the mounting base and buckle. Instead, the wiper blade of the present invention will more closely follow the belt contour and deflect outward when encountering belt splices and other anomalies in the belt contour.

The thicker base section adds structural rigidity by increasing the moment of inertia, and by providing a suitable angle mounting plane for the thin blade tip. The angle mounting plane also cants the central axis of the tip, reducing the compression load offset. Since the use of softer more resilient materials can be used in the wiper blade of the present invention, the thicker base section better absorbs the compressive operational loads for stable and "chatter-free" operation.

The third component is the higher profile metal mounting insert. This effectively extends the metal stiffening rib well into the blade body, and this improvement alone reduces the effective column length by over 25% when compared to prior art designs.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
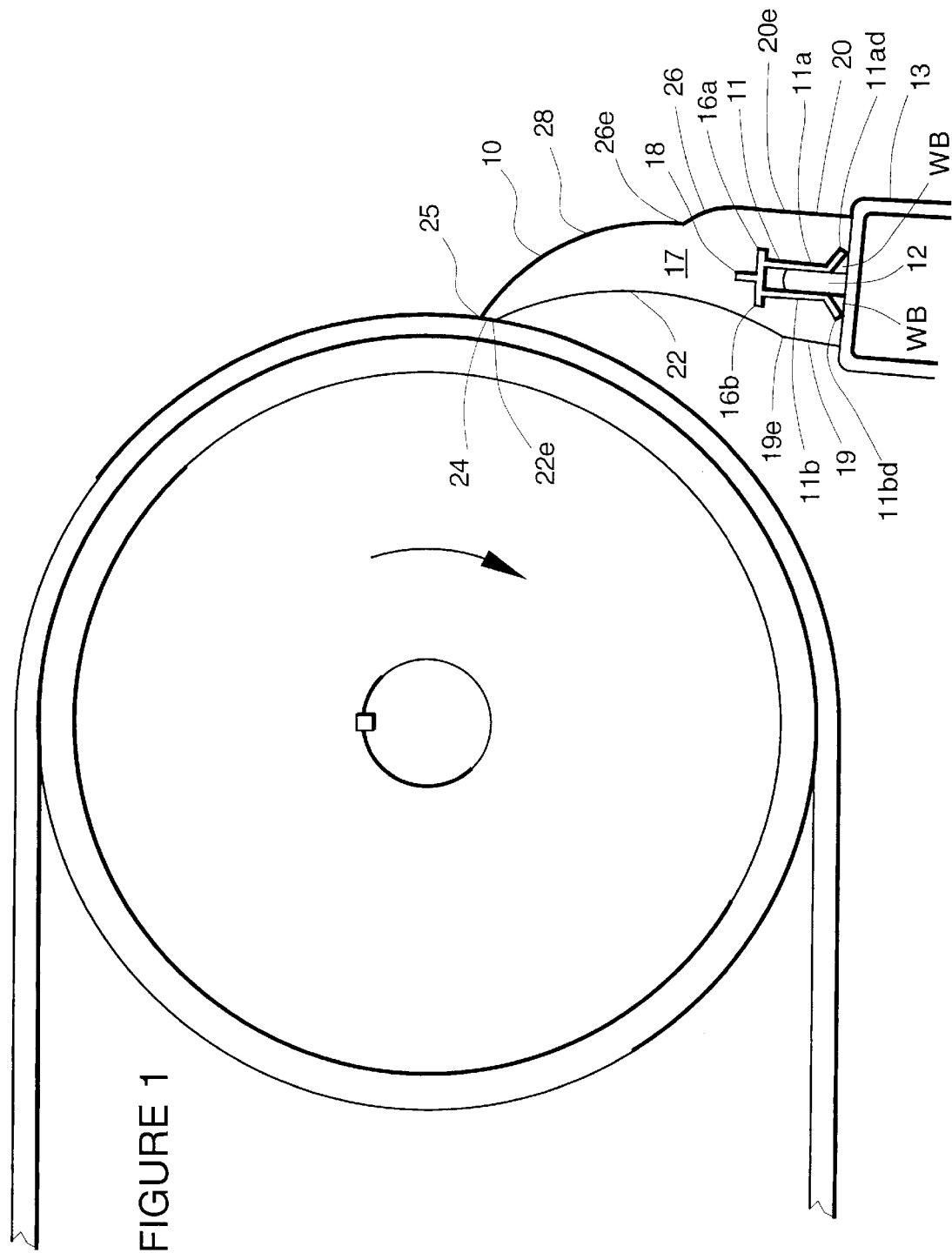
FIG. 1 is a side elevational view of a belt conveyor cleaner system incorporating the invention.
Figure 3:
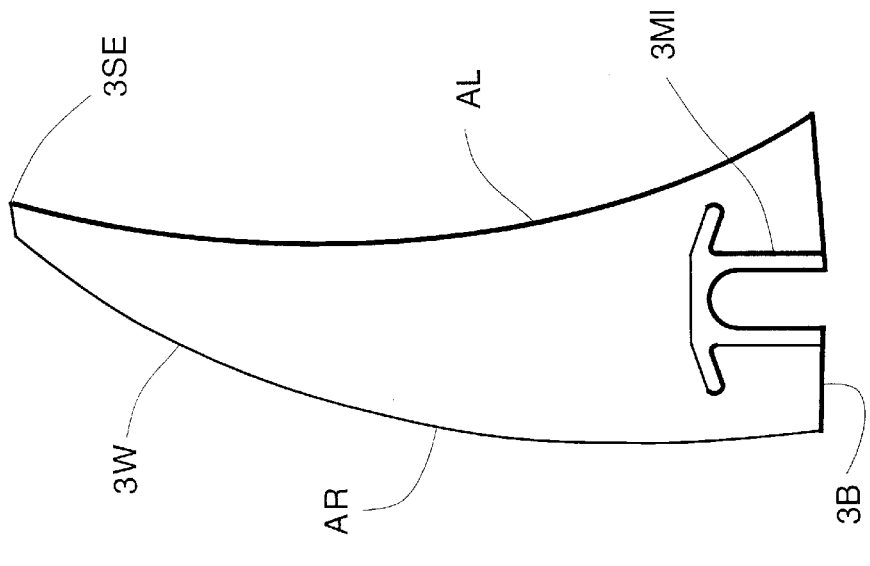
FIG. 3 is a sectional view of a wiper blade of the prior art as exemplified in the above-referenced Gordon patent.
Figure 2:
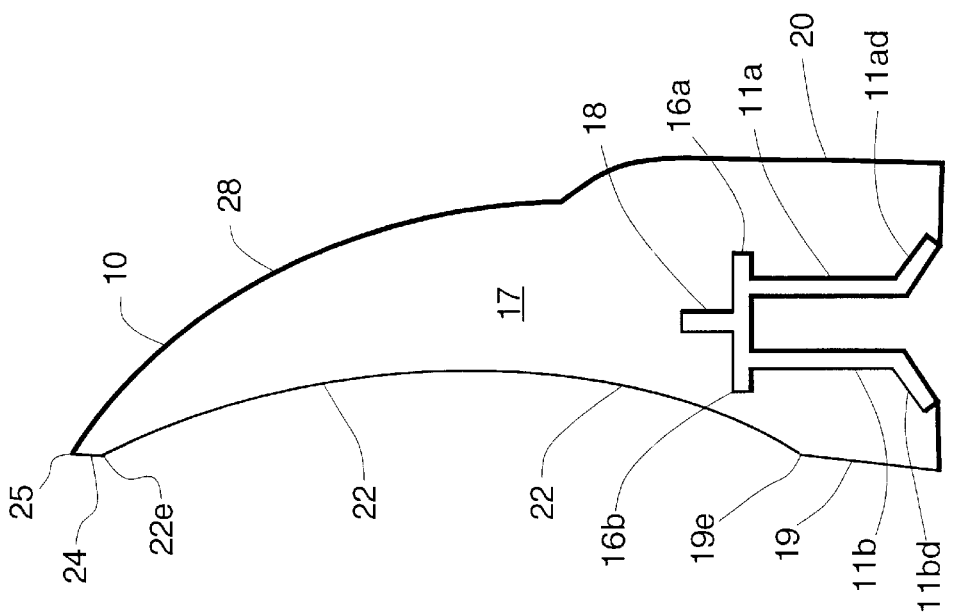
FIG. 2 is an enlarged sectional view of the wiper blade incorporating the invention.

Referring to FIGS. 1 and 2, a belt wiper blade 10 incorporating the present invention has a metal mounting insert 11 which has a relatively high profile and thus extends deeply within the base of the body of wiper blade 10. Metal mounting insert 11 has a pair of legs 11a, 11b which are spaced apart a distance sufficient to receive a mounting rib 12 of a tensioning apparatus 13 (partially shown). The legs 11a and 11b diverge at 11ad and 11bd to accommodate welding beads WB which secure mounting rib 12 on the tensioning apparatus bar 13. Conventional pins (not shown) are utilized to secure wiper blade 10 on mounting rib 12. The upper portion 18 of metal mounting insert 11 has a pair of locking shoulders 16a, 16b which serve to lock the molded elastic polymer portion 17 onto metal mounting insert 11. It will be noted that the metal mounting insert 11 includes an upwardly projecting finger or rib 18 which serves to extend the profile of the metal mounting insert deeply within the body of the polymer casting forming the blade body. This higher profile metal mounting insert effectively extends the metal stiffening rib well into the blade body and improves the effective column length by over 25% when compared to the prior art.

The wiper blade body 17 has first and second straight wall portions 19 and 20. These straight wall portions extend from the base and serve to thicken the base structure and add structural rigidity by increasing the moment of inertia and providing a suitable angle mounting plane for the thinner blade tip. The upper end 19e of straight wall surface 19 connects with curved wall portion 22 which is smoothly and concavely curved to a point 22e where it is converted to a short straight section 24 which performs a scraper edge 25. The upper edge 20e of straight portion 20 merges to a curved surface 26 which, at its upper end 26c, forms a large concavity with upper curved surface 28. These multiradius side profiles shorten the effective column height so that the bending moment generated by the operational forces is now resisted primarily at the transition point or concavity point 26e (e.g. the point of maximum concavity).

The thicker base structure adds structural rigidity by increasing the moment of inertia and providing a suitable angled mounting plane for the thin blade tip. The angled mounting plane also cants the central axis of the tip reducing the compression load effect. Moreover, because of the thicker base section, the softer more resilient materials can be used, and the thicker base section better absorbs compressive operational loads for stable and "chatter-free" operation.

It should be noted that this multiradius, concave side profile transitions to the thicker, ridged base profile. The bending moment generated by operational forces is now resisted primarily at the transition point of two profiles, e.g. the point of maximum concavity.

In summary, these three features: multiradius concave side profile, thicker base section and high profile metal mounting insert, act together to substantially reduce the bending moments associated with wiper blade operational and provide an improved structural profile with a higher moment of inertia and shorter effective column length. Moreover, these structural improvements allow the use of softer and more wear-resistant elastic polymer without the risk of blade buckling.

In the preferred embodiment, the invention incorporates wear-resistant elastic polymers and is a polyurethane formulation designed for performance with abrasion in mind. In one embodiment, an 83 A durometer polyurethane material provided excellent results.

While a preferred embodiment of the invention has been illustrated and described, it will be appreciated that other embodiments, adaptations and modifications of the invention will be readily apparent to those skilled in the art.

What is claimed is:

1. A scraper blade for conveyor belt cleaning systems comprising, in combination:

a high profile metal mounting insert, and a flexible blade of molded, resilient elastomeric resin having a wide base wall having a pair of straight wall sections extending from said wide base wall, a concavely curved surface beginning a substantial distance above said base wall and extending to a further straight wall, said further straight wall having an upper edge forming a scraper edge, a concavely shaped outer wall comprised of a first curved section which is coupled to the longer of said straight walls which extend down to the said base section and extending to the point of maximum concavity, and a second curved section which extends from said point of maximum concavity upward to said scraping edge, said plane of maximum concavity defining the effective column height for said blade and the torsion-resistant point thereof.

2. The scraper blade defined in claim 1 wherein said metal mounting insert includes a stiffening rib which extends well into the blade body to reduce the effective column length.

3. A scraper blade for conveyor belt cleaning systems as defined in claim 1 wherein said metal mounting insert includes a pair of legs, said legs having diverging end portions.

* * * * *